C. L. DABOLL.
Truck.
No. 21,120.
Patented Aug. 10, 1858.
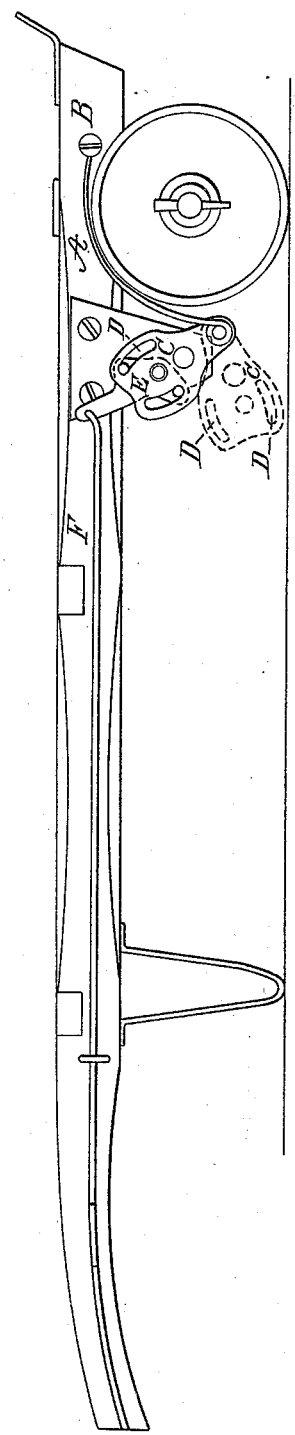

UNITED STATES PATENT OFFICE.

C. L. DABOLL, OF NEW LONDON, CONNECTICUT.

APPLYING BRAKES TO HAND-TRUCKS.

Specification of Letters Patent No. 21,120, dated August 10, 1858.

*To all whom it may concern:*

Be it known that I, C. L. DABOLL, of New London, in the county of New London, in the State of Connecticut, have invented a new and useful Improvement in Hand-Trucks, which consists in the application of brakes to the same.

My brake is so arranged as to act at all times automatically adverse to the line of motion, and that too whether the truck be drawn or pushed from behind, enabling the operator to keep the load under easy control in descending an inclined surface an improvement of great importance to steam boat and rail road companies and warehousemen.

To enable others skilled in the art to construct one of my improvements I will proceed to describe its construction and operation as follows, reference being had to the accompanying drawings forming a part of this my specification.

I construct my brake bar A of a broad flat piece of iron answering in form to the upper and hinder portion of the periphery of the wheel, the outer end of such brake bar is a curved spring and attached to the frame of the truck by a bolt or screw B in such a manner that the brake is kept at all times by the action of the spring off the wheel. To the other or inner end of the brake bar I hinge a short lever plate C, in the outer sides of which are two slots, D, through which slots protrude from a cam E lying underneath it, two pins. Cam E is hinged in the center and at equal distance from the pins aforementioned. To the upper or lever end of the said cam is attached an iron rod F which runs along the side of the frame of the truck to which it is confined by staples and terminates in a looped handle, near the handle of the truck.

The operation of my machine is as follows: In approaching an inclined surface with a load, the operator has only to pass his hand, through the loop to the rod, when, by the natural and easy action of resistance the brake is thrown upon the wheel and its too rapid progress instantly checked and kept under the easy control of the operator, and that too, whether the same be drawn or pushed; my brake acting at all times adverse to the line of motion.

Instead of the curved spring forming a part of the brake bar, I propose to apply any of the ordinary forms of springs in the manner that will best answer the purpose. It is also proposed by me to apply when necessary a brake to each wheel of the car, in which case the brake bar A might be dispensed with and sufficient power to check the wheel be obtained by allowing the ends of the cam lever E to apply directly to the wheel, so altering the same as to give the largest surface practicable.

Having thus described my invention what I claim as new and desire to secure by Letters Patent is,

The application of the above described devices to hand trucks, in the manner and for the purposes set forth.

C. L. DABOLL.

Attest:
JOHN S. HOLLINGSHEAD,
F. W. RITTER.